Aug. 15, 1950     P. J. RIES     2,518,817
TRIPOD
Filed Nov. 30, 1945
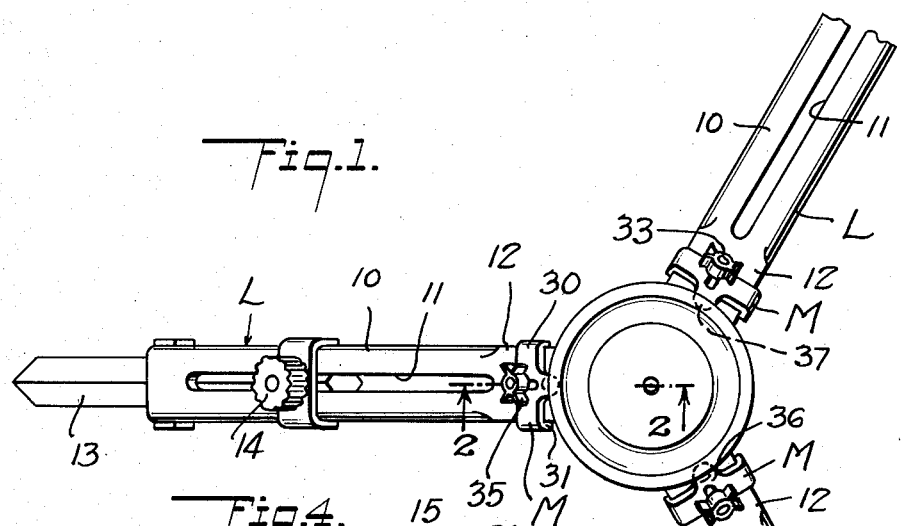
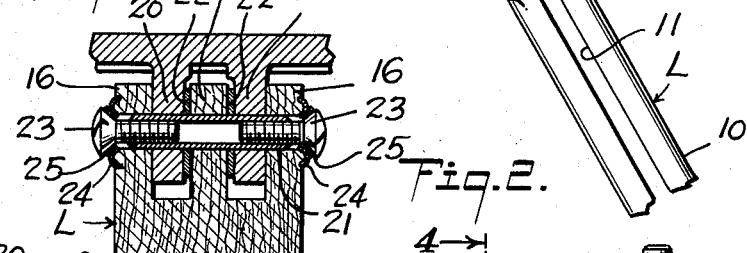
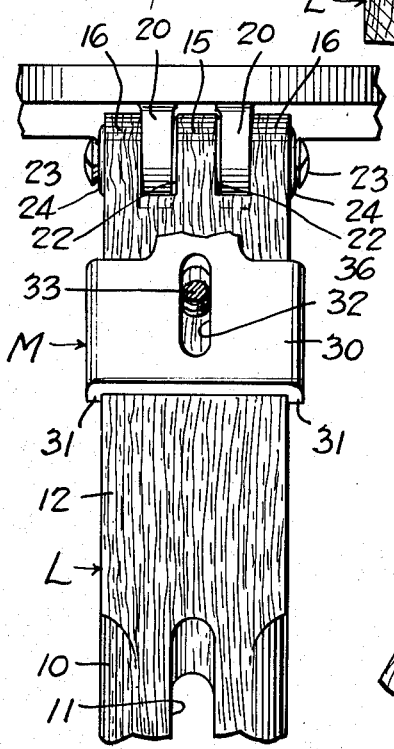
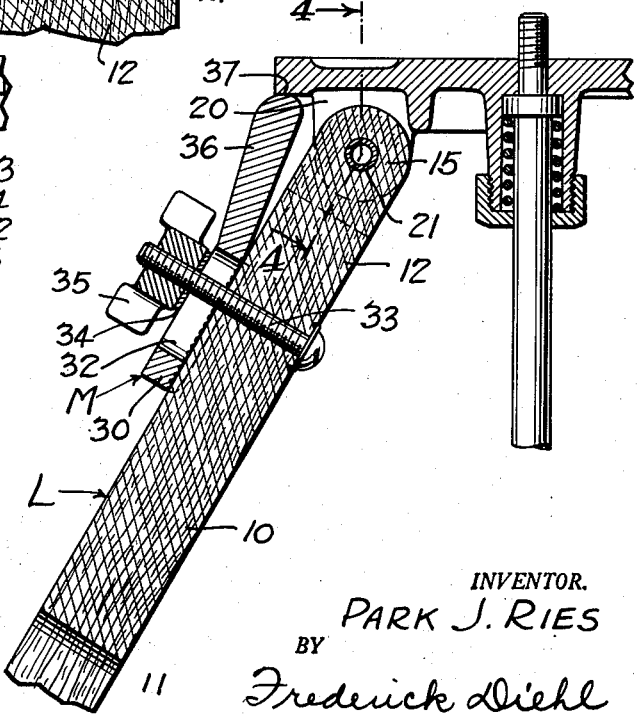
INVENTOR.
PARK J. RIES
BY
Frederick Diehl
ATTORNEY Patented Aug. 15, 1950

2,518,817

UNITED STATES PATENT OFFICE 2,518,817

TRIPOD

Park J. Ries, Los Angeles, Calif.

Application November 30, 1945, Serial No. 631,826

3 Claims. (Cl. 248—168)

This invention relates to tripods of the general character embodied in the United States Letters Patent of Paul L. Ries and Park J. Ries, No. 2,234,357, issued March 11, 1941, and wherein is disclosed and claimed stop members on the tripod legs co-actable with the tripod head to maintain the legs against spreading beyond any selected supporting position of adjustment, so as to prevent collapse of the tripod should its legs be struck or be resting on a surface providing insufficient friction to insure the tripod against displacement, all to the end of protecting the apparatus on the tripod against damage attending collapse of the tripod.

An object of the present invention is to provide a tripod whose legs are particularly designed and structurally characterized to mount the adjustable leg supporting means or stop members for co-action with the tripod head in maintaining the legs against spreading beyond any selected position of adjustment, while utilizing a rugged one-piece hardwood leg construction at the pivotal connection of the legs to the tripod head, having a long and absolutely rigid bearing formed by several alternating and interfitting bearing ears on the head and legs receiving a pivot pin with which headed screws co-act to produce a clamping pressure upon the several bearing ears and thereby set up friction at several locations along the length of the bearing insuring a pivotal connection free of any looseness or "play," and having maximum strength against structural failure under the most severe conditions met in practice.

Another object of this invention is to provide a tripod leg and pivotal connection structure between the legs and tripod head, which is characterized by its structural simplicity and durability, minimum number of parts, ease of assembly, and positiveness of operation to maintain the connection absolutely rigid for pivotal adjustment of the tripod legs without any looseness or play.

With these and other objects in view, the invention resides in the combinations, arrangements and functional relationships of elements as set forth in the following specification and particularly pointed out in the appended claims.

In the accompanying drawing,

Figure 1 is a plan view of one form of tripod embodying this invention;

Figure 2 is an enlarged fragmentary vertical sectional view taken on the line 2—2 of Figure 1;

Figure 3 is a view in side elevation of the pivotal connection between each leg of the tripod and the tripod head, with the stop member on the leg partially broken away for the sake of clearness; and Figure 4 is a sectional view of the pivotal connection structure embodying this invention, taken on the line 4—4 of Figure 2.

Referring specifically to the drawing, each tripod leg L is illustrated as including a one-piece upper section 10 of hardwood such as maple or birch having a longitudinal slot 11 terminating a considerable distance from the upper end of the leg so that the upper end portion 12 is a solid, integral body. The lower section 13 of each leg (Figure 1) is adjustable on the upper section 10 and is adapted to be clamped thereto by a clamping member 14 forming no part of the present invention.

The upper end portion 12 of each leg L is suitably milled or recessed to provide several bearing ears or lugs, preferably three or more in number, the center ear being designated by 15, and the side ears by 16. The side ears are spaced from the center ear to receive therebetween spaced metal bearing ears or lugs 20 depending from the underside of the tripod head H.

A tubular pivot pin 21 is driven tightly through alined openings in the ears 15, 16 and 20, and is of a length less than the total length of the bearing provided by the several ears 15, 16 and 20, so as to be spaced from the ends of the bearing as shown in Figure 4.

The pin 21 passes through openings in friction washers 22 of fibre or other suitable material which are tightly received between the center ear 15 of the leg and the confronting faces of the ears 20 of the head as shown clearly in Figure 4. The end portions of the pin 21 are internally threaded to receive the bodies of flathead screws 23 on which are mounted shallow cup-shaped finish washers 24 and lock washers 25 disposed between the washers 24 and the screw heads.

Upon tightening the screws 23, the finish washers 24 become partially embedded in the outer surfaces of the ears 16, and sufficient clamping pressure is imposed upon the several ears 15, 16 and 20 for the friction washers 22 to set up the necessary friction to retain any pivotal adjustment of the leg, yet permit the leg to be manually adjusted as desired.

By the pivotal connection structure above described, a long, rigid and rugged bearing for each tripod leg is obtained, with any and all lateral or axial play permanently eliminated, and maximum rigidity of the legs on the head insured under the most severe service conditions. Maximum structural strength of the upper end portion 12 of each leg is assured by the integral one piece construction thereof, on which is mounted one of the stop members M, each comprising a flat-rectangular body 30 having laterally spaced side flanges 31 sufficiently spaced to receive the upper end portion 12 of the leg to guide the stop member rectilinearly on the leg section 10. The body 30 is provided with a slot 32 receiving a screw 33 threaded tightly through a bore in the leg portion 12 and having a washer 34 and a hand nut 35.

The stop member M is thus slidably mounted on the tripod leg for adjustment longitudinally thereof and clamping in any selected position without weakening the strength of the integral leg portion 12. Projecting from the body 30 is an arm 36, the free end portion of which constitutes an abutment 37 adapted to engage the underside of the tripod head adjacent its periphery, for co-action with the head in definitely limiting opening movement of the leg in various spread positions, or in preventing opening movement of the leg from closed position, depending on the adjusted position along the length of the leg at which the stop member is clamped to the leg by the nut 35. In order to avoid any possibility of the stop member shifting or slipping on the leg L when the stop member is frictionally clamped thereto, the inner face of the body 30 is roughened by transverse serrations or teeth 38 or other suitable means which will tend to penetrate or more firmly grip the leg.

From the foregoing description, it will be manifest that maximum structural strength is obtained at the novel pivotal connection structure between the legs and head, to resist any load imposed on the upper portion 12 of the legs resulting from the tendency of the legs to spread beyond a selected adjusted position, and by an extremely simple construction composed of a minimum number of parts requiring but a minimum number of operations to manufacture and assemble, thus enabling the cost of the product to be materially reduced.

I claim:

1. In a tripod, a metal head having a plurality of depending spaced apart ears provided with alined bores and parallel confronting faces perpendicular to the axes of said bores; legs of hardwood construction, each having an integral, one-piece upper portion recessed at spaced locations to receive said ears of the head and to provide a plurality of ears, one of which is received between the ears of the head, and the others of which are disposed at the opposite sides of the ears of the head; said ears of the legs having alined bores and parallel faces perpendicular to the axes of such bores; a pivot pin tightly fitting said bores of the head and leg ears; and means co-acting with said pivot pin, by which a clamping pressure can be exerted upon the said ears for their co-action in providing a rigid, pivotally adjustable connection between the head and leg, free of all looseness, with sufficient friction being set up to releasably retain the leg in any selected position of adjustment.

2. In a tripod, a metal head having a plurality of depending, spaced apart ears provided with alined bores and parallel confronting faces perpendicular to the axes of said bores; legs of hardwood construction, each having an integral, one-piece upper portion recessed at spaced locations to receive said ears of the head and to provide a plurality of ears, one of which is received between the ears of the head, and the others of which are disposed at the opposite sides of the ears of the head; said ears of the legs having alined bores and parallel faces perpendicular to the axes of such bores; a tubular pivot pin tightly fitting said bores of the head and leg ears, and having a length less than the overall length of the bearing formed by all of the ears; and headed screws threaded into the ends of said pin and engaging the endmost ears for co-action therewith in providing a rigid, pivotally adjustable connection between the head and leg, free of all axial and radial looseness, and with sufficient friction being set up to releasably retain the leg in any selected position of adjustment.

3. In a tripod, a metal head having a plurality of depending, spaced apart attaching ears provided with alined bores and parallel confronting faces perpendicular to the axes of said bores; legs of hardwood construction, each having an integral, one-piece upper portion recessed at spaced locations to receive said ears of the head and to provide a plurality of attaching ears, one of which is received between the ears of the head, and the others of which are disposed at the opposite sides of the ears of the head; said ears of the legs having alined bores and parallel faces perpendicular to the axes of such bores; a tubular pivot pin tightly fitting said bores of the head and leg attaching ears; and means co-acting with said pivot pin, by which a clamping pressure can be exerted upon said ears for their co-action in providing a rigid pivotally adjustable connection free of all axial and radial looseness, and with sufficient friction being set up to releasably retain the leg in any selected position of adjustment.

PARK J. RIES.

REFERENCES CITED

The following references are of record in the file of this patent:

UNITED STATES PATENTS

| Number | Name | Date |
| --- | --- | --- |
| 939,859 | Pullen | Nov. 9, 1909 |
| 1,898,469 | Tonsor | Feb. 21, 1933 |
| 2,214,301 | Hendricks | Sept. 10, 1940 |
| 2,262,938 | Howard | Nov. 18, 1941 |
| 2,442,000 | Furnas | May 25, 1948 |